Jan. 19, 1965

M. C. NELSON 3,166,210

SCREW ANCHOR SECURING TOOL

Filed May 9, 1962

INVENTOR.
Milton C. Nelson
BY
Norman E. H. Helitzke
Atty.

United States Patent Office 3,166,210
Patented Jan. 19, 1965

3,166,210
SCREW ANCHOR SECURING TOOL
Milton C. Nelson, 10155 S. Eberhart Ave., Chicago, Ill.
Filed May 9, 1962, Ser. No. 193,453
1 Claim. (Cl. 218—43)

This invention relates to improvements in screw anchor securing tools. More specifically stated, this invention pertains to improvements in the so-called hammerless or self expanding type of screw anchor securing tools which is provided with a cylindrical anvil or compression member at one end thereof, and against which compression member the anchor assembly is compressed and radially expanded during the anchor securing or setting operation by the application of compressive forces through the use of screw means.

Screw anchor securing or setting tools of the general type contemplated by this invention are commonly used to expand a soft metal sheath, as for example, a lead sheath, in a hole in a wall, floor, or the like, by drawing a cone-shaped and hard expander and anchor element outwardly, partially through the sheath, thereby locking or setting or securing the sheath in the hole and locking the expanding element in the sheath, thus setting or securing the anchor assembly in the hole. The apex or outwardly directed end of the cone-shaped expander element is commonly threaded to receive the threaded end of a screw used in the anchoring of items to the thus seated anchor assembly.

In the seating of anchor assemblies of the type contemplated by this invention, it is a common experience to find that the hole in the wall or floor or like surface is not truly round and is frequently broken out or enlarged at the open end thereof. In many instances, such holes are not perpendicular to the surface of the wall or floor, etc. and very commonly are of a depth considerably greater than the length of the anchor assembly. Such conditions result in setting the anchor assembly too deep in the hole, off-center with respect to the hole, and at an incline to the surface of the wall. It is also very common to find that the surface of the floor or wall is somewhat irregular or slightly wavy.

It is therefore an object of this invention to provide an improved new, novel and useful screw anchor securing tool for properly expanding screw anchors; which is easy to operate; which is of simple and relatively inexpensive construction, sturdy and durable in use; which utilizes conventional machine screw elements in the accomplishment of the anchor assembly expanding operation; which is provided with a guide and gauge means and a centering and positioning anvil portion for coactively engaging the wall or floor or the like in which the anchor assembly is to be set, whereby to secure the accurate axial positioning and accurate centering of the anchor assembly in the hole in the wall and whereby to accurately and automatically position the end of the set anchor element with respect to the surface of the wall and in perpendicular relation to the surface of the wall.

A further object of this invention is to provide an improved tool of the type contemplated by this invention, wherein adjustments with respect to the position of the gauge plate relative to the anvil element of the tool may be easily and quickly made to enable setting the anchor assembly at a predetermined depth in the hole in which it is to be secured.

An improved screw anchor securing tool embodying the various new, novel and useful improvements of this invention, whereby to attain the foregoing objectives, possesses the advantages of simplicity and relative inexpensiveness of construction, and sturdiness and durability in operation. The improved tool also possesses a further advantage, in that the screw and nut elements used in the applying of compressive forces to the anchor assembly during the expanding or setting operations are conventional machine screw and nut elements, and may, as desired, be quickly and easily exchanged or replaced by screw and nut combinations of different thread size, thereby making the improved tool readily adaptable for use in setting a variety of sizes of anchor assemblies. A still further and unique advantage of the improved tool resides in the ability of the tool to automatically center the anchor assembly in the hole during the securing of setting operations, and to so set the anchor assembly that the threaded anchor element is perpendicular to the surface of the wall and that the outer end of the secured anchor element is flush with the surface of the wall. Another advantage of the improved tool resides in the novel adjustable operation of the guide or gauge plate, whereby the anchor assembly to be set may be inserted and adjustable and predetermined distance into the hole in which it is to be secured or set and be automatically and accurately maintained in that position and expanded at the exact predetermined position within the hole.

The foregoing and other objectives, important new, novel and useful features and advantages of this invention will become more apparent and be more easily understood upon examination of the following description thereof and the accompanying drawings and the appended claim. It should, however, be remembered that, without desire of limitation, the invention will be described and illustrated as the preferred embodiment of the invention in a screw anchor securing tool. Certain changes and variations in the invention may, upon review of this application, suggest themselves to those skilled in the pertinent arts, which changes may, however, not depart from the spirit of this invention and may come within the scope of the appended claim.

Figure 4:
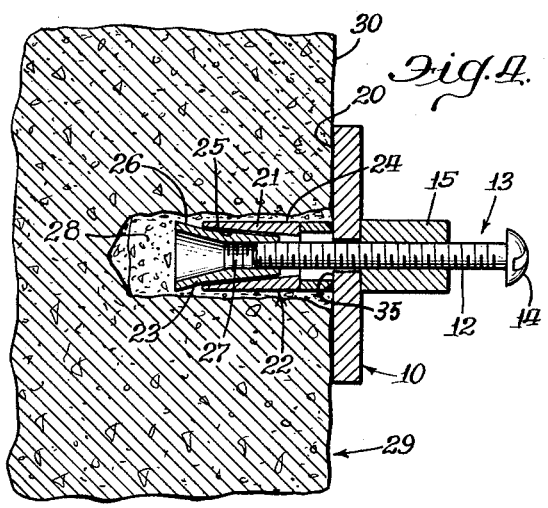
Figure 6:
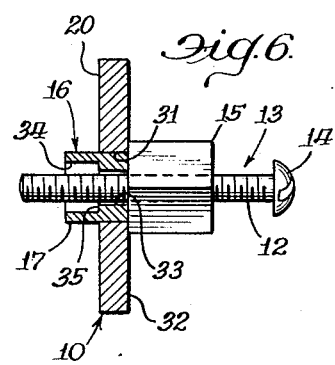
Figure 5:
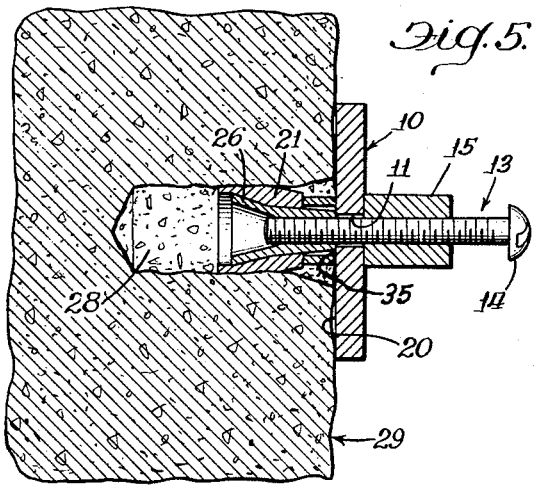
Figure 7:
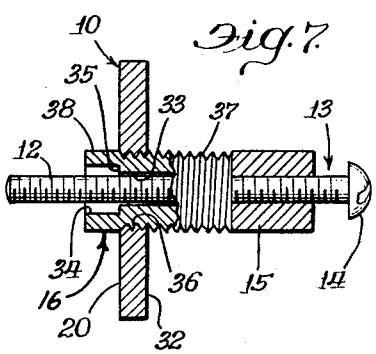

FIGURE 4 is an elevational view, partially in longitudinal section, showing a screw anchor assembly releasably threaded to the screw anchor securing tool and in operative position preparatory to setting or expanding the anchor assembly, with the anchor assembly inserted into a hole in a wall or the like and with the gauge plate of the tool in anchor setting position against the surface of the wall;

FIGURE 5 is a view similar to that shown in FIGURE 4, with the soft sheath of the anchor assembly expanded or seated in the hole in the wall and with the hard expander element drawn forwardly partially through the sheath so that the forward or outer end of the expander element abuts against the guide or gauge and expansion limiting plate of the tool and the expander element is locked in position perpendicular to the surface of the wall with the end thereof flush with the surface of the wall;

FIGURE 6 is a side elevational view, partially in broken away section, showing a modified form of the improved screw anchor securing tool embodying the present invention; and FIGURE 7 is a side elevational view, partially in broken away section, showing a further modified and adjustable form of the improved tool.

Referring to the drawings, in which like elements are identified by like numbers, and referring first and in particular to FIGURES 1 to 5 of the drawings, 10 represents generally a flat guide and gauge plate which may be rectangular in shape and which, as compared to the size of the hole in which the anchor assembly is to be seated, is relatively long and wide, for example four to five times as long and three to four times as wide as the diameter of the hole.

Gauge plate 10 is made of rigid material, such as soft steel, and is of sufficient thickness as to preclude the bending thereof during normal use. A transverse, circular aperture 11 extends through the center of plate 10, and is slightly larger in diameter than the outer diameter of the threaded shank 12 of the elongated machine screw 13 which extends through the aperture 11. Screw 13 is provided at one end thereof with a suitable head, such as a slotted head 14, adapted for convenient engagement by a conventional screw driver. A nut 15 is threaded onto screw shank 12 intermediate the screw head 14 and the gauge plate 10.

A hollow, cylindrical or tubular anvil element 16, which has outer and inner cylindrical and coaxial surfaces 17 and 18 respectively, is secured, as by welding 19, to the flat side 20 of plate 10, opposite the screw head 14, and has its outer and inner surfaces 17 and 18 arranged coaxially with the axis of the aperture 11, and has the flat free end of the anvil element 16 parallel to the surface 20. The diameter of surface 17 of element 16 is substantially the same as the outer diameter of the soft sheath 21 of the anchor assembly 22 to be secured in the wall by the use of the tool. The inner diameter of the cylindrical passage or aperture 18 through element 16 is sufficiently greater than the small end of the hard expander and anchor element 23 of assembly 22, and element 16 is of such length, that the small end of expander 22 may be inserted into passage 18 a sufficient distance so that the inserted end thereof engages the annular portion 35 of the surface 20 of gauge plate 10 at the inner end of the passage 18 in anvil element 16 where the portion 35 comprises an annular shoulder means perpendicular to the axis of the bore hole 18 and joining and defining the adjacent ends of the cylindrical surfaces of the bore hole 18 and the aperture 11.

Anchor assembly 22 is of conventional construction and includes the hollow soft sheath 21, having a cylindrical outer surface 24 and a cone-shaped inner surface 25. Sheath 21 is commonly formed of lead or similar soft metal. Assembly 22 also includes the hard, hollow expander 23, commonly formed of steel, which has a generally cone-shaped outer surface 26 which is generally complementary to cone-shaped surface 25. The hollow cone-shaped expander 23 is threaded interiorly at 27, at its apex end, to receive the threaded free end of screw shank 12. The axial lengths of the expander 23 and the sheath 21 are substantially equal and the outer diameter of the base of the cone-shaped expander 23 is substantially equal to the outer diameter of the sheath 21. The radial thickness of the wall of the sheath 21 is such that the cone-shaped expander 23 can, prior to the expansion of sheath 21, be only partially inserted into the complementary cone-shaped hole defined by the surface 25 in sheath 21.

Figure 1:
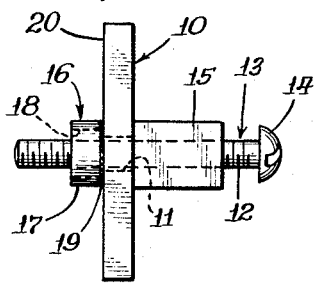
FIGURE 1 is a side elevational view of the improved screw anchor securing tool embodying the present invention.
Figure 2:
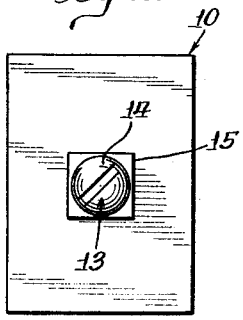
FIGURE 2 is a right hand elevational view of the tool shown in FIGURE 1.
Figure 3:
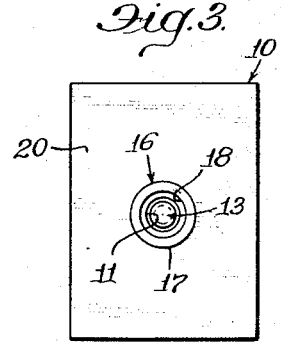
FIGURE 3 is a left hand elevational view of the improved tool shown in FIGURE 1.

After the hole 28 is drilled into the wall or floor or like surface 29, which floor or the like is often of cementitious material, such as cement, mortar, etc. and which hole 28 commonly has a relatively irregular surface and a broken out or expanded outer end, and which floor or wall 29 frequently has an irregular or slightly wavy surface 30, the improved tool is assembled as shown in FIGURE 1. The anchor unit 22 is then assembled on the end of the tool by inserting the expander 23 into sheath 21 and then threading the inner end of expander 23 onto the end of screw shank 12, which extends through the anvil element 16. Thereafter nut 15 is tightened on screw shank 12 against gauge plate 10 until the inner end of sheath 21 snugly engages the adjacent outer end of anvil 16. The anchor assembly 22 and anvil 16 are then inserted into hole 28 until the flat face 20 of gauge plate 10 snugly engages the adjacent surface 30 of the wall 29, as shown in FIGURE 4. Plate 10 is then held forcefully against wall 29 while a screw driver is engaged in the slotted head end 14 of screw 13, to prevent the turning of the screw 13, and a wrench or the like is applied to nut 15 and nut 15 is forcefully tightened on screw 13 against plate 10. To thus forcefully tighten nut 15 on screw 13, draw screw 13 outwardly through aperture 11 in plate 10, thereby forcefully drawing the enlarged end of anchor expander 23 into the sheath 21 and expanding sheath 21 into locked, expanded position in the hole 28 and also frictionally locking expander 23 in the expanded sheath 21, thus permanently setting anchor assembly 22 in the hole 28. Such setting or anchoring operation, involving the tightening of nut 15, can continue only until the inner apex of expander 23 has entered the hollow anvil element 16 sufficiently to engage the face 20 of plate 10, at which time the apex end of expander 23 will be exactly flush with the outer surface 30 of wall 29 and also perpendicular to the surface of wall 29.

The relative dimension of the outer diameter of the anvil 16 and the diameter of the hole 28, and the perpendicular arrangement between the flat surface 20 of plate 10 and the axis of anvil 16, will force the expander 23 to assume an ultimate seated position centrally of the outer end of hole 28 with the apex end of the expander 23 flush with and perpendicular to the surface 30 of wall 29. Such improved results are achieved irrespective of the fact that the hole 28 may be somewhat irregular in shape and may also be slightly inclined to the plane of the surface 30 of wall 29. The forceful holding of the gauge plate 10 against the wall during the expanding of the soft metal sheath 21, will force the soft metal to "flow" sufficiently to achieve such centered and perpendicular and flush positions of the anchor element as described above for the properly seated anchor assembly.

After the anchor assembly 22 has thus been set or secured in hole 28, the improved anchor securing tool may be easily removed by unthreading screw 13 from the end of expander 23, whereafter the seated anchor assembly 22 may be used for its intended purpose, in conventional manners.

The modification of the improved screw anchor securing tool shown in FIGURE 6, differs from that shown in FIGURES 1 to 5, in that the anvil element 16 of FIGURE 6, is longer than the anvil element 16 of FIGURES 1 to 5, by the thickness of the gauge plate 10. As shown in FIGURE 6, the modified form of anvil element 16 is press fitted into an enlarged central aperture 31 in gauge plate 10, with the press fitted end of the anvil element flush with the surface 32 of plate 10. The cylindrical, coaxial bore 33 through the press fitted end of the cylindrical element 16 of FIGURE 6, is slightly greater in diameter than the outer diameter of the threaded shank end 12 of screw 13. The coaxial and cylindrical bore hole in the free end of anvil 16 of FIGURE 6, is of the same diameter as the coaxial cylindrical bore hole 18 of the anvil 16 of FIGURES 1 to 5. The adjacent ends of the bore holes 33 and 34 are joined by an annular shoulder 35, perpendicular to the axis of anvil 16. The shoulder 35 lies in the same plane as the surface 20 of plate 10, and corresponds, functionally, to that portion of the surface 20 of plate 10 of FIGURE 1 which is circumscribed by the bore hole 18 of anvil 16 of FIGURE 1. In operation the modification of the invention shown in FIGURE 6, is the same as that shown in FIGURES 1 to 5.

The modification of the invention shown in FIGURE 7, is comprised of the gauge plate 10, provided with a transverse, centrally positioned and threaded aperture 36, into which the hollow or tubular anvil element 16 is adjustably threaded. Anvil element 16 of FIGURE 7, is comprised of a hollow cylinder having the threaded portion 37 of its outer surface which extends through plate 10 on the side of the nut 15, threaded in reverse order with respect to the threading of the screw 13. The opposite end 38 of the cylindrical outer surface of anvil 16 of FIGURE 7, is unthreaded and extends outwardly from surface 20 of plate 10 and is of the same diameter as surface 17 of anvil 16 of FIGURES 1 to 5. The opposite ends of the anvil 16 are parallel to the surface 20 of plate 10 and the end of anvil 16 adjacent nut 15 functions as a seat for nut 15 when nut 15 is tightened on screw 13 during the anchor assembly expanding operation.

Anvil element 16 of FIGURE 7, like unto the anvil element 16 of FIGURE 6, is provided with the coaxial inner cylindrical bores 33 and 34 and the annular shoulder 35 joining the adjacent ends of the bores 33 and 34.

When anvil 16 has been threaded into plate 10 a maximum distance as shown in FIGURE 7, then shoulder 35 will be in the same plane as the surface 20 of gauge plate 10.

In operation the modification of the invention shown in FIGURE 7, is the same as that shown in FIGURES 1-6, with the exception, that according to the modification shown in FIGURE 7, the axial position at which the anchor assembly 22 will be expanded in hole 28 can be adjusted by threading the anvil 16 either farther in or farther out of plate 10, as desired. When anvil 16 is threaded into plate 10 the maximum distance, as shown in FIGURE 7, then the portion of anvil 16 which extends out of the plate 10 on the side opposite nut 15 will be exactly the same size as the anvil portion 16 of FIGURE 1.

From the foregoing description of this invention and from the accompanying drawings, it will be apparent that this invention realizes the introductorily enumerated objectives respecting the improved tool. It will similarly be apparent that the invention possesses the hereinbefore listed advantages and provides new, novel and useful improvements in a screw anchor securing tool.

Having thus described and illustrated the preferred embodiments of this invention, the invention is not to be interpreted as being restricted to the specifically illustrated and described embodimens, as set forth in the drawings and as hereinbefore described, except insofar as is necessitated by the appended claim and the disclosures of the prior art.

The invention is hereby claimed as follows:

A screw anchor securing tool, comprising, in combination, a rigid gauging and positioning plate means having an internally threaded and circular aperture therethrough and having first and second flat and smooth opposite side surfaces, a tubular and cylindrical anvil means having screw threads on a portion of its outer cylindrical surface and adjustably threaded through the aperture in said plate means and rigidly extending from said first side surface and having a free end spaced from said first side surface and having an inner and coaxially and longitudinally extending and cylindrical bore hole opening outwardly through said free end of said anvil means and in coaxial relation with the aperture in said plate means and having the inner end of said bore hole terminate at shoulder means adapted to be positioned in the plane of said first side of said plate means, said plate means having dimensions perpendicular to the axis of said aperture and said bore hole which dimensions are relatively large compared to the maximum dimensions of said anvil means perpendicular to the axis of said aperture and said bore hole, screw means having tool engaging means at one end thereof and having a threaded shank freely extending through the coaxial aperture and bore hole in said plate means and said anvil means respectively, said tool engaging means of said screw means being positioned adjacent said second side of said plate means, and nut means threaded onto said threaded shank, said nut means having maximum dimensions perpendicular to the axis of the aperture and bore hole in said plate means and said anvil means greater than the maximum diameter of said aperture and bore hole.

References Cited in the file of this patent

UNITED STATES PATENTS

| | | |
|---|---|---|
| 1,177,843 | Ackerman et al. | Apr. 4, 1916 |
| 1,842,698 | Stitt | Jan. 26, 1932 |
| 2,641,378 | Wilt | June 9, 1953 |
| 2,995,266 | Crawford | Aug. 8, 1961 |